United States Patent
Kinsella et al.

(10) Patent No.: US 10,309,463 B2
(45) Date of Patent: Jun. 4, 2019

(54) JOINT MEMBER WITH EXTENSION TRAVEL RESTRICTION FEATURE

(71) Applicant: Neapco Drivelines, LLC, Belleville, MI (US)

(72) Inventors: Michael Peter Kinsella, White Lake, MI (US); Michael Walter Hopson, Clinton Township, MI (US); Shakib Mohammad-Gou, Canton, MI (US); Riki Patel, Sterling Heights, MI (US); Nick Dubiel, Fenton, MI (US)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 209 days.

(21) Appl. No.: 15/248,410

(22) Filed: Aug. 26, 2016

(65) Prior Publication Data
US 2017/0058960 A1 Mar. 2, 2017

Related U.S. Application Data (60) Provisional application No. 62/209,948, filed on Aug. 26, 2015.

(51) Int. Cl.
*F16D 3/205* (2006.01)

(52) U.S. Cl.
CPC ......... *F16D 3/2055* (2013.01); *Y10S 464/905* (2013.01); *Y10S 464/906* (2013.01)

(58) Field of Classification Search
CPC . F16D 3/2055; Y10S 464/905; Y10S 464/906

USPC ....... 464/111, 115, 120, 123, 124, 146, 167; 384/55

See application file for complete search history.

(56) References Cited

U.S. PATENT DOCUMENTS

| | | | |
|---|---|---|---|
| 4,432,740 A * | 2/1984 | Petiot | F16D 3/226 464/146 |
| 4,437,219 A | 3/1984 | Dore | |
| 4,786,270 A | 11/1988 | Iwasaki | |
| 6,251,019 B1 | 6/2001 | Hofmann et al. | |
| 6,261,184 B1 * | 7/2001 | Jacob | F16D 3/224 464/146 |
| 6,390,926 B1 | 5/2002 | Perrow | |
| 6,736,730 B2 | 5/2004 | Sugiyama et al. | |
| 6,843,728 B2 * | 1/2005 | Sugiyama | F16O 29/04 464/111 |
| 7,289,752 B2 | 10/2007 | Yamazaki et al. | |
| 7,531,119 B2 | 5/2009 | Sueoka et al. | |

(Continued)

FOREIGN PATENT DOCUMENTS

| | | | | |
|---|---|---|---|---|
| EP | 0 048 650 A1 * | 3/1982 | ..... | 464/146 |
| GB | 6462 * | 5/1895 | ..... | 464/120 |
| GB | 567596 * | 2/1945 | ..... | 464/146 |

*Primary Examiner* — Greg Binda
(74) *Attorney, Agent, or Firm* — Shumaker, Loop & Kendrick, LLP; James D. Miller (57) ABSTRACT

An outer joint member for a joint assembly configured to receive an inner joint includes a wall forming a hollow chamber having a closed end and an open end. A plurality of restrictors are coupled to the hollow chamber each having a portion thereof extending outwardly from the inner surface of the wall of the hollow chamber. The plurality of restrictors extending from the inner surface of the wall proximate the open end of the hollow chamber.

8 Claims, 5 Drawing Sheets

(56) References Cited

U.S. PATENT DOCUMENTS

| | | |
|---|---|---|
| 7,540,807 B2 * | 6/2009 | Nakagawa ............ F16D 3/2055 464/111 |
| 7,922,590 B2 | 4/2011 | Pallante |
| 8,214,509 B2 | 7/2012 | Dabagh et al. |
| 8,231,475 B2 | 7/2012 | Felchner et al. |

* cited by examiner

JOINT MEMBER WITH EXTENSION TRAVEL RESTRICTION FEATURE

CROSS-REFERENCE TO RELATED PATENT APPLICATIONS

This patent application claims the benefit of U.S. Provisional Patent Application No. 62/209,948, filed on Aug. 26, 2015. The entire disclosure of the above patent application is hereby incorporated herein by reference.

FIELD

The present invention relates to joint assemblies and more particularly to an assembly and method of restricting undesired displacement of an inner joint member from an outer joint member of the joint assembly.

BACKGROUND OF THE INVENTION

Joint assemblies such as constant velocity joints are common components in automotive vehicles for applications requiring a transmission of rotating motion such as constant velocity motion. Constant velocity joints are typically used in front wheel drive vehicles and rear wheel drive vehicles to transmit torque from a transmission of a vehicle to the drive wheels at a constant velocity or speed. Although, in certain applications, constant velocity joints can be used in all wheel drive and four wheel drive vehicles.

Common types of constant velocity joints include an outer joint member and an inner joint member. The outer joint member typically includes a hollow chamber which is open at one end and closed at an opposing end, with recesses and/or tracks formed in an inner wall thereof. The inner joint member is configured to receive a shaft of the vehicle and includes roller assemblies coupled thereto. The outer joint member co-axially receives the inner joint member. The roller assemblies rotationally engage with the tracks formed in the outer joint member and permit angular displacement, and in certain scenarios, axial displacement of the inner joint member with respect to the outer joint member. Examples of a constant velocity joint are shown and described in U.S. Pat. Nos. 6,251,019, 7,922,590, and 8,231,475, the disclosures of which are hereby incorporated herein by reference in their entirety.

Disadvantageously, during installation, handling, maintenance, or operation of the constant velocity joint, the inner joint member may undesirably and/or unintentionally become displaced from a desired position within the outer joint member. Particularly, undesired axial displacement of the inner joint member from the outer joint member is problematic and can result in separation of the inner joint member from the outer joint member. Additionally, when undesirable axial displacement occurs, the roller assemblies and/or other components of the constant velocity joint may become dislodged or damaged. To overcome this disadvantage, some constant velocity joints include an external restriction plate, a retention ring, or material staking to restrict the inner joint member from becoming undesirably displaced.

However, these restriction features increase cost and complexity of manufacturing of the constant velocity joints. Additionally, these restriction features add complexity to maintenance or servicing of the constant velocity joint. In certain scenarios, the restriction features may become fatigued or exhibit performance degradation upon incorrect or repetitive servicing or handling thereof.

It would be desirable to provide a joint assembly with a restriction feature that prevents undesired displacement of an inner joint member from an outer joint member, prevents damage to the joint assembly, and minimizes a cost and complexity of manufacturing thereof while maximizing an ease of maintenance thereof.

SUMMARY OF THE INVENTION

In accordance and attuned with the present invention, a joint assembly with a restriction feature that prevents undesired displacement of an inner joint member from an outer joint member, prevents damage to the joint assembly, and minimizes a cost and complexity of manufacturing thereof while maximizing an ease of maintenance thereof, has surprisingly been discovered.

According to an embodiment of the disclosure, an outer joint member for a joint assembly configured to receive an inner joint member is disclosed. The outer joint member includes a wall forming a hollow chamber having a closed end and an open end. A plurality of restrictors are coupled to the hollow chamber each having a portion thereof extending outwardly from the inner surface of the wall of the hollow chamber. The plurality of restrictors extending from the inner surface of the wall proximate the open end of the hollow chamber.

According to another embodiment of the disclosure, a joint assembly includes a hollow outer joint member including a wall forming an open end and a closed end. An inner joint member has a plurality of roller assemblies coupled thereto. The plurality of roller assemblies are received in the outer joint member. A restrictor is configured to engage at least one of the plurality of roller assemblies to militate against undesired displacement of the inner joint member with respect to the outer joint member.

According to yet another embodiment of the disclosure, a joint assembly is disclosed. The joint assembly includes a hollow outer joint member including a wall forming an open end and a closed end. The hollow outer joint member having an annular array of recesses formed therein. Each of the annular array of recesses having a pair of longitudinally extending opposing tracks. An inner joint member has a plurality of roller assemblies coupled thereto. The plurality of roller assemblies are received in the pair of tracks and movable along the pair of tracks with respect to an axial direction of the outer joint member. A restrictor is coupled to the wall of the outer joint member. The restrictor is configured to engage with at least one of the plurality of roller assemblies to militate against undesired displacement of the inner joint member with respect to the outer joint member.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The above advantages of the invention will become readily apparent to those skilled in the art from reading the following detailed description of an embodiment of the invention in the light of the accompanying drawings, in which.

DETAILED DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

The present technology relates to joint assemblies, such as constant velocity joints, used in motor vehicles. However, the present disclosure can apply to other types of joint assemblies used in motor vehicles or in other applications. Joint assemblies according to the disclosure are configured to facilitate a transmission of rotational forces and torque to components of a motor vehicle such as the wheels, for example.

FIGS. 1-4 show a joint assembly 10 according to an embodiment of the present disclosure. The joint assembly 10 includes an inner joint member 12 and an outer joint member 14. The joint assembly 10 is configured as a tripod-type constant velocity joint similar to the constant velocity joint shown and described in U.S. Pat. No. 7,922,590, the disclosure of which is hereby incorporated by reference in its entirety herein. However, in other embodiments, the joint assembly 10 can be configured as a ball-type constant velocity joint similar to a ball-type constant velocity joint shown and described in U.S. Pat. No. 5,855,519, the disclosure of which is hereby incorporated by reference in its entirety herein. However, it is understood that the joint assembly 10 can be configured as a constant velocity joint or joint assembly of any type having an inner joint member and an outer joint member, as desired.

Figure 1:
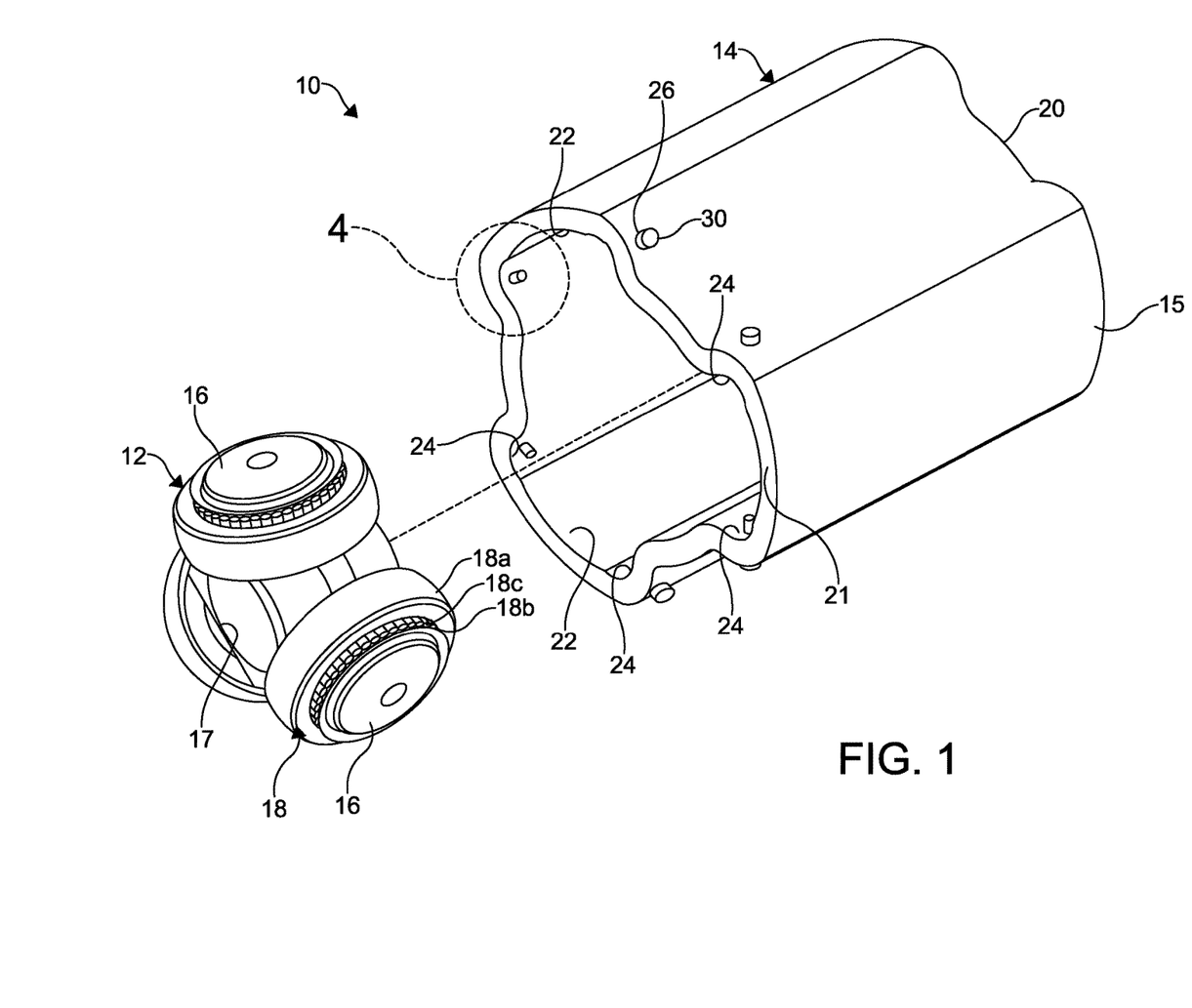
FIG. 1 is a partially exploded top perspective view of a joint assembly according to an embodiment of the disclosure.

As illustrated, the inner joint member 12 of the joint assembly 10 is configured as a tripod joint including arms 16 extending radially outwardly therefrom. The inner joint member 12 is configured to be splined with a shaft (not shown) of the vehicle. For example, a central bore 17 is splined and receives a splined shaft. The inner joint member 12 includes three arms 16 extending radially therefrom. It is understood that the inner joint member 12 can be configured for a ball-type constant velocity joint similar to a ball-type constant velocity joint shown and described in U.S. Pat. No. 5,855,519, the disclosure of which is hereby incorporated by reference in its entirety. However, it is understood that the inner joint member 12 can be configured for a constant velocity joint or joint assembly of any type having an inner joint member and an outer joint member, as desired.

Each of the arms 16 includes a roller assembly 18 engaging a distal end thereof. The roller assembly 18 includes an outer roller 18a, an inner roller 18b, and rolling members 18c such as rollers of a needle bearing disposed between the outer roller 18a and the inner roller 18b. The roller assembly 18 can include retainers maintaining the rolling members 18c disposed between the inner roller 18b and the outer roller 18a. The roller assembly 18 is configured to permit an axial movement and angular displacement of the inner joint member 12 with respect to the outer joint member 14 as the inner joint member 12 is moved in and out of the outer joint member 14.

Figure 2:
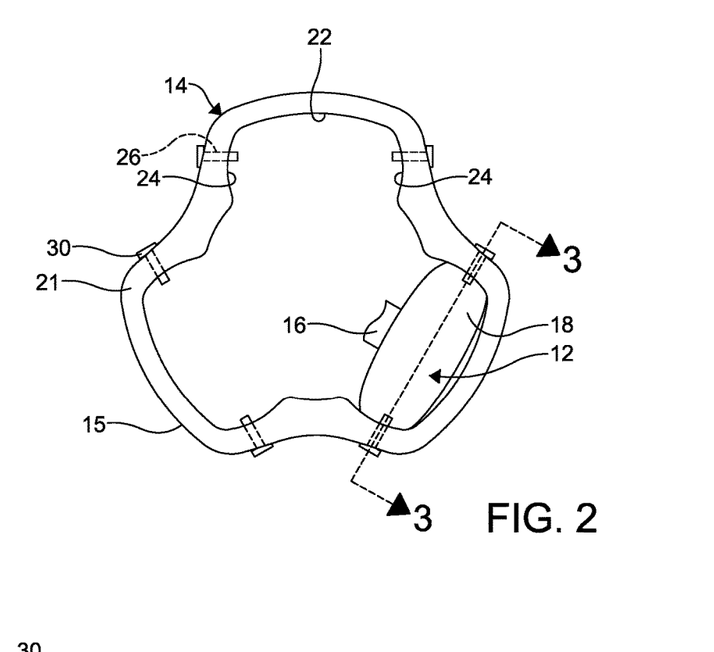
FIG. 2 is a top plan view of an outer joint member of the joint assembly of FIG. 1, wherein a partial top view of an inner joint member received in the outer joint member is also shown.

The outer joint member 14 is configured as a hollow chamber having a closed end 20, an open end 21, and an annular array of recesses 22 on an inner surface of a wall forming the chamber. The joint member 14 has a substantially tri-lobal cross-sectional shape. Each of the recesses 22 includes a pair of longitudinally extending opposing tracks 24. Each of the recesses 22 receives one of the roller assemblies 18 of the inner joint member 12, wherein the outer roller 18a of each of the roller assemblies 18 engages the tracks 24 of the recesses 22 of the outer joint member 14 and are configured to move in an axial direction along the tracks 24.

Figure 4:
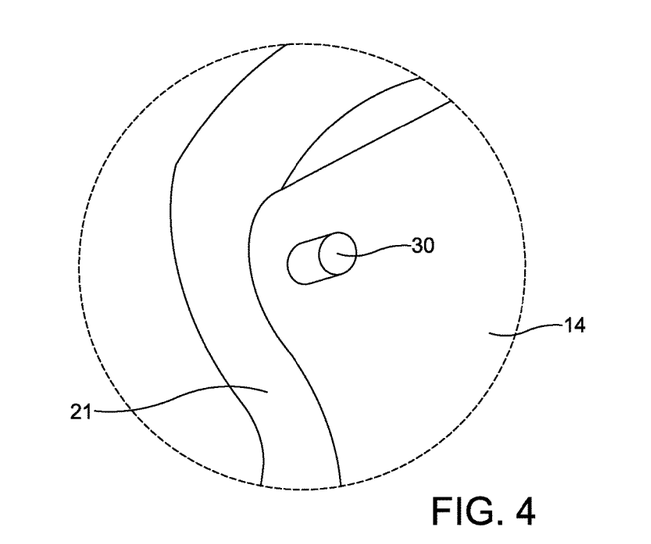
FIG. 4 is an enlarged fragmentary top perspective view of an outer joint member of FIG. 1 highlighted by circle 4, illustrating a restrictor.

The outer joint member 14 includes a plurality of restrictors 30 configured to facilitate restricting the inner joint member 12 from undesired displacement or removal from the outer joint member 14. In the embodiment illustrated the restrictors 30 are received through a plurality of apertures 26 formed through the outer joint member 14 proximate the open end 21 thereof. In the embodiment illustrated, there are six apertures 26 formed through the outer joint member 14, wherein one aperture 26 is formed at each of the tracks 24. However, in other embodiments the outer joint member 14 can include more than or fewer apertures 26 as desired depending on the number of restrictors 30 desired. For example, the outer joint member 14 can include three apertures 26, wherein one aperture 26 is formed in one of the tracks 24 of each of the recesses 22. In other examples, the apertures 26 can be formed through a portion of the recesses 22 separate from the tracks 24. Other configurations can be contemplated as desired without departing from the scope of the present invention.

Figure 3:
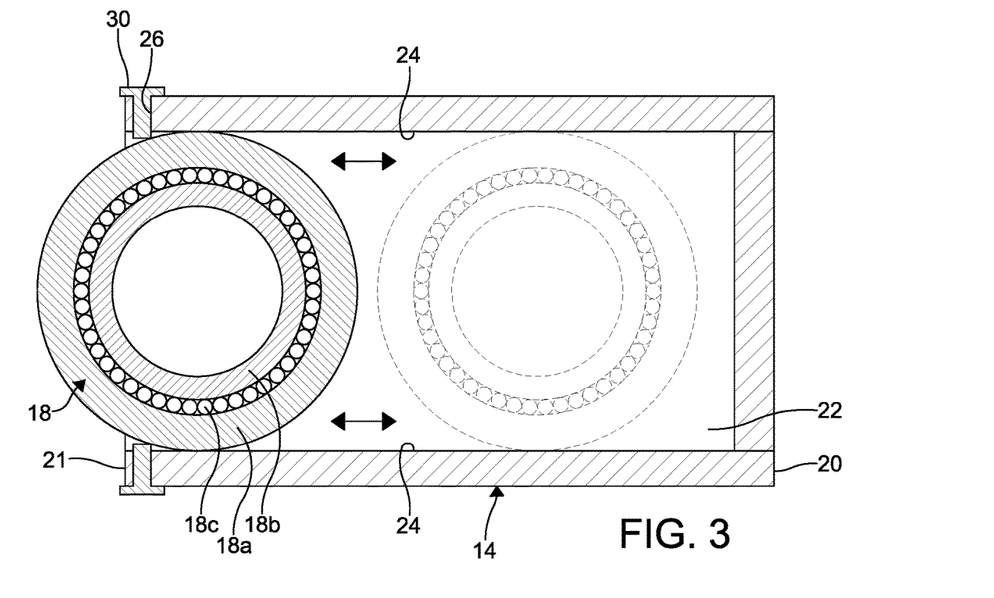
FIG. 3 is a cross-sectional view of the outer joint member taken along lines 3-3 of FIG. 2 illustrating restrictors, wherein a travel of a roller assembly of an inner joint member of the joint assembly of FIG. 1 is schematically illustrated.

The restrictors 30 are configured as a plurality of protrusions. Each of the restrictors 30 extends through one of the apertures 26 and extends inwardly a distance from an inner surface of the outer joint member 14. The restrictors 30 are configured to engage with the roller assemblies 18 to restrict an undesired displacement of the inner joint member 12 with respect to the outer joint member 14. Each of the restrictors 30 extends substantially perpendicular to the inner surface of the tracks 24 of the outer joint member 14. As shown in FIG. 3, the roller assemblies 18 move along the tracks 24 as indicated by the double headed arrows. The roller assemblies 18 engage the restrictors 30 at a restricted position of the roller assemblies 18 with respect to the outer joint member 14. In the restricted position, the roller assemblies 18 extend partially outwardly from the open end 21 of the outer joint member 14 while the restrictors 30 militate against the roller assemblies 18, and thus the inner joint member 12, from entirely being removed from the outer joint member 14.

As shown, each of the restrictors 30 can be a pop-rivet, a stud, a pin, a screw, a bolt, a rod, a surface feature extending from the inner surface of the outer joint member 14, or any other similar device or feature configured to facilitate restricting the inner joint member 12 from undesired displacement from the outer joint member 14. In a non-limiting example, as shown, the restrictors 30 can include a flange or head to abut an outer surface of the outer joint member 14 when received through the aperture 26. In another example, a notch (not shown) can be formed in the outer surface of the outer joint member 14 adjacent the apertures 26 to receive the flange or the head of the restrictors 30 so that an end of the restrictors 30 is substantially flush with or recessed below the outer surface of the outer joint member 14. In another non-limiting example, the restrictors 30 can be flangeless, wherein the end of each of the restrictors 30 is flush with the outer surface of the outer joint member 14. Each of the restrictors 30 can be secured through the apertures 26 by an interference fit, an adhesive, a threaded engagement, a material upset, or other similar securement means. Additionally, the restrictors 30 can be integrally formed with the inner surface of the wall 15 of the outer joint member 14. It is understood, each of the roller assemblies 18 can simultaneously be positioned in the restriction position when the inner joint member 12 is moving in an axial direction or less than an entirely of the roller assemblies 18 can be in the restriction position when the inner joint member 12 is displaced at an angle with respect to the outer joint member 14.

Figure 5:
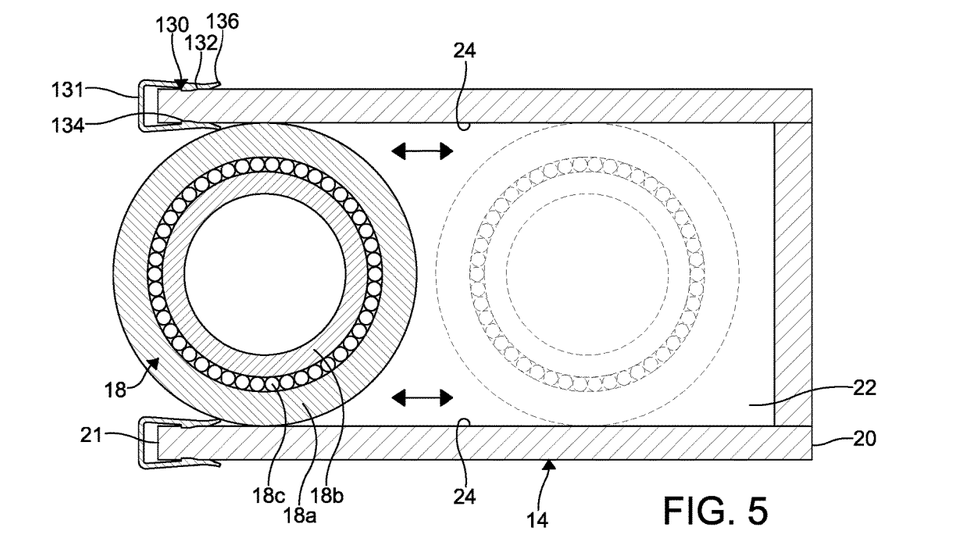
FIG. 5 is a cross-sectional view of the outer joint member taken along lines 3-3 of FIG. 2 illustrating restrictors according to another embodiment of the disclosure, wherein a travel of a roller assembly of an inner joint member of the joint assembly of FIG. 1 is schematically illustrated.
Figure 5A:
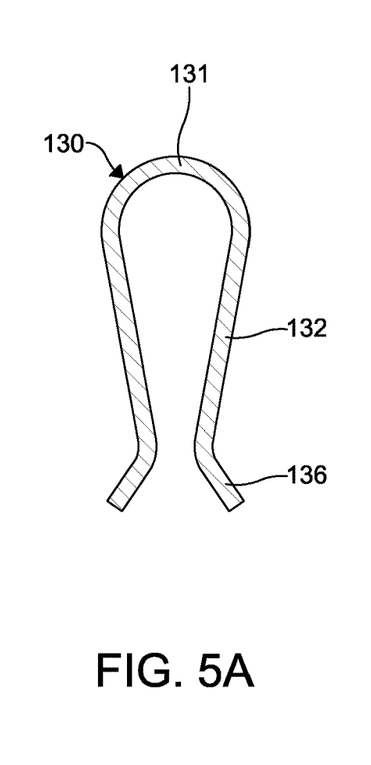
FIGS. 5A-5C illustrate front elevational views of restrictors according to varying embodiments of the disclosure.
Figure 5B:
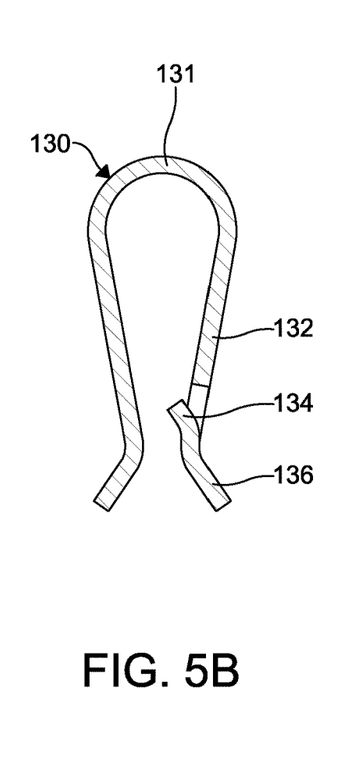
Figure 5C:
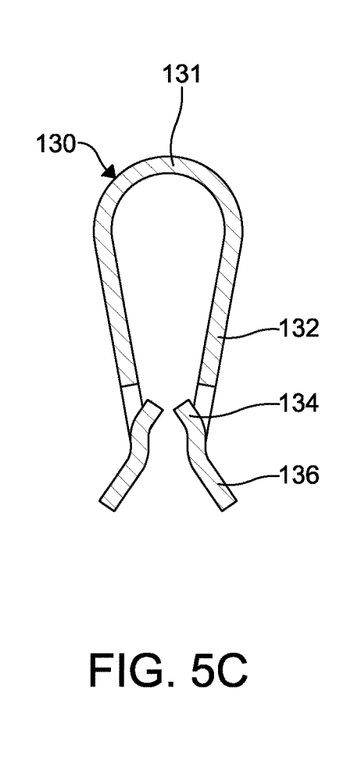

In FIGS. 5-5C, the restrictors 30 are formed as clips 130 according to another embodiment of the disclosure. Features other than the clips 130 of the joint assembly 10 of FIGS. 5-5C include features similar to the features described and shown with respect to FIGS. 1-4. Features similar to the features of the joint assembly 10 described hereinabove with respect to FIGS. 1-4, other than the clips 130, include the same reference numerals for convenience and consistency.

Each of the clips 130 has an end 131 and two legs 132 extending from opposite sides of the end 131. In the embodiment shown in FIG. 5, the end 151 is substantially flat or planar to correspond to the wall at the open end 21 of the outer joint member 14. In another embodiment as shown in FIGS. 5A-5C, the end 131 can be arcuate shaped. In certain embodiments, the clips 130 include barbs 134 formed on an inner surface of the legs 132. The barbs 134 can be formed on one of the legs 132 as shown in FIG. 5B or each of the legs 132 as shown in FIGS. 5 and 5C.

Each of the clips 130 is inserted at the open end 21 of the outer joint member 14 wherein the legs 132 bestride the wall 15 forming the outer joint member 14 and extend along a length of the tracks 24. The legs 132 frictionally engage the wall to facilitate securement of the clips 130 to the outer joint member 14. The barbs 134 engage the wall 15 or the apertures 26 formed in the outer joint member 14 to further facilitate securement of the clips 130 to the outer joint member 14. The distal end 136 of the legs 132 are flared outwardly away from the clips 130. The clips 130 engage the roller assembly 18 at the restriction position to militate against the roller assemblies 18, and thus the inner joint member 12, from entirely being removed from the outer joint member 14.

Figure 6:
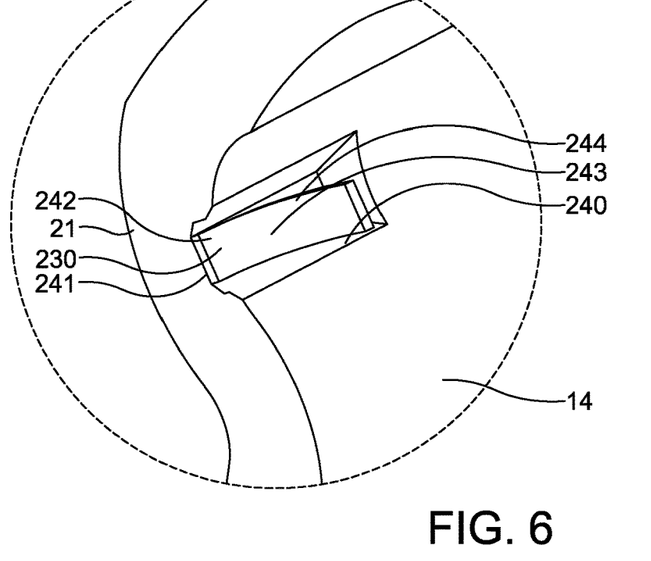
FIG. 6 is an enlarged fragmentary top perspective view of an outer joint member of FIG. 1 highlighted by circle 4, illustrating a restrictor according to another embodiment of the disclosure.

In FIG. 6, the restrictors 30 are formed as tabs 230 according to another embodiment of the disclosure. Features other than the tabs 230 of the joint assembly 10 of FIG. 6 include features similar to the features described and shown with respect to FIGS. 1-4. Features similar to the features of the joint assembly 10 described hereinabove with respect to FIGS. 1-4, other than the tabs 230, include the same reference numerals for convenience and consistency.

The tabs 230 are disposed in recesses 240 formed on an inner surface of the wall 15 forming the outer joint member 14. Each of the tabs 230 has a first end 242 with a first surface 241 and a second surface 243 that are substantially planar and a second end 244 that flares outwardly in an arcuate manner with respect to the second surface 243 of the first end 242. In the embodiment illustrated, the recesses 240 are substantially rectangular shaped and have an inner surface that is planar. However, the recesses 240 can be any shape as desires such as ovular or triangular shaped, for example. The recesses 240 are disposed adjacent an inner edge of the open end 21 of the outer joint member 14. The first end 242 of the tabs 230 are coupled to the inner surface of the recesses 240, wherein the second end 244 extends outwardly from the recesses 240 and from the inner surface of the wall 15 forming the outer joint member 14. The second end 244 of the tabs 230 engages the roller assembly 18 at the restriction position to militate against the roller assemblies 18, and thus the inner joint member 12, from entirely being removed from the outer joint member 14.

Figure 7:
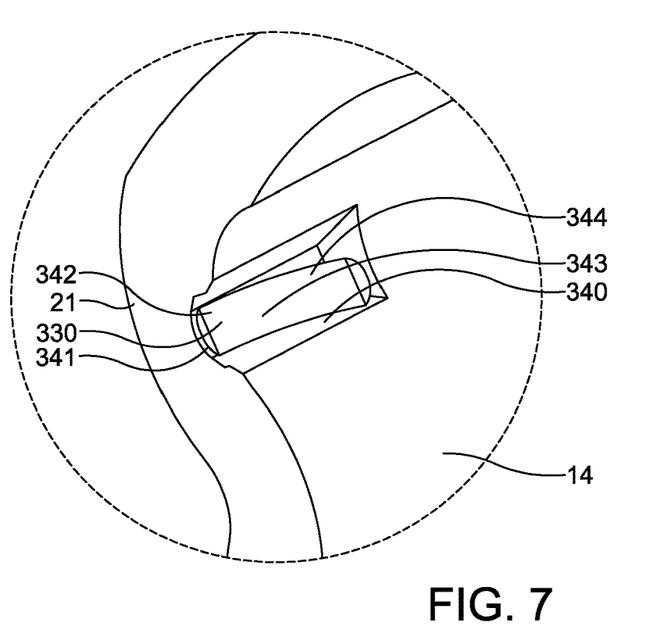
FIG. 7 is an enlarged fragmentary top perspective view of an outer joint member of FIG. 1 highlighted by circle 4, illustrating a restrictor according to another embodiment of the disclosure.

In FIG. 7, the restrictors 30 are formed as tabs 330 according to another embodiment of the disclosure. Features other than the tabs 330 of the joint assembly 10 of FIG. 7 include features similar to the features described and shown with respect to FIGS. 1-4. Features similar to the features of the joint assembly 10 described hereinabove with respect to FIGS. 1-4, other than the tabs 330, include the same reference numerals for convenience and consistency.

The tabs 330 are disposed in recesses 340 formed on an inner surface of the wall 15 forming the outer joint member 14. Each of the tabs 330 has a first end 342 with a first surface 341 and a second surface 343. The first surface 341 is arcuate and the second surface 343 is substantially planar. A second end 344 flares outwardly in an arcuate manner from the second surface 343 of the first end 342. In the embodiment illustrated, the recess 340 are substantially rectangular shaped and have an inner surface with an arcuate shape to correspond to the shape of the first surface 341 of the first end 342 of the tabs 330. However, the recesses 340 can be any shape as desired such as ovular or triangular shaped, for example. The recesses 340 are disposed adjacent an inner edge of the open end 21 of the outer joint member 14. The first end 342 of the tabs 330 are coupled to the inner surface of the recesses 340, wherein the second end 244 extends outwardly from the recesses 340 and from the inner surface of the wall forming the outer joint member 14. The second end 344 of the tabs 330 engages the roller assembly 18 at the restriction position to militate against the roller assemblies 18, and thus the inner joint member 12, from entirely being removed from the outer joint member 14.

Each of the tabs 230, 330 are thin and flexible and can be formed from a metal or plastic. Each of the first ends 242, 342 of the tabs 230, 330 are coupled to the recesses 240, 340 by a spot welding process or adhesive process. Although, other processes can be contemplated such as bolting, pinning, or integrally forming the first ends 242, 342 of the tabs 230, 340 to the recesses 240, 340, for example.

A boot (not shown) configured for sealing at least a portion of the inner joint member 12 and the outer joint member 14 is coupled adjacent to the open end 21 of the outer joint member 14. The boot covers the restrictors 30.

To assemble the joint assembly 10, the inner joint member 12 is positioned within the outer joint member 14. The restrictors 30 are secured to the outer joint member 14 to militate against an undesired displacement of the inner joint member 12 with respect to the outer joint member 14. The boot is coupled to the outer joint member 14 to cover the inner joint member 12, the open end 21 of the outer joint member 14, and the restrictors 30.

In the embodiments where the restrictors 30 are the tabs, 230, 330, the tabs 230, 330 allow the inner joint member 12 to be inserted into the outer joint member 14 after the tabs 230, 330 are coupled to the outer joint member 14. In the embodiments with the restrictors 30 as tabs 230, 330, the inner joint member 12 and the roller assemblies 18 can slide over the flexible second end 244, 344 of the tabs 230, 330 to allow the inner joint member 12 to be received in the outer joint member 14. Once the inner joint member 12 is slid over the tabs 230, 330 of the outer joint member 14, the second end 244, 344 of the tabs 230, 330 protrudes outwardly from the inner surface of the wall 15 forming the outer joint member 14 to militate against the inner joint member 12 from being displaced or removed from the outer joint member 14.

Advantageously, during maintenance of the joint assembly 10, each of the restrictors 30 can be independently removed and/or replaced as desired. The joint assembly 10 according to the present invention is low cost, easy to manufacture, and easy to assemble. The restrictors 30 restrict the inner joint member 12 from undesired displacement or disassembly from the outer joint member 14, thereby militating against damage to the roller assemblies 18 or other components of the constant velocity joint.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An outer joint member for a joint assembly configured to receive an inner joint member comprising:
   a wall forming a hollow chamber having a closed end and an open end; and
   a plurality of restrictors coupled to the wall, each of the plurality of restrictors having a portion thereof extending outwardly from an inner surface of the wall of the hollow chamber, the plurality of restrictors extending radially inwardly from the inner surface of the wall adjacent the open end of the hollow chamber, wherein each of the plurality of restrictors is a pop-rivet, a stud, a pin, a screw, a bolt, or a rod.

2. The outer joint member of claim 1, wherein each of the plurality of restrictors extends through the wall of the hollow chamber.

3. The outer joint member of claim 1, wherein the outer joint member has a substantially tri-lobal cross-sectional shape.

4. The outer joint member of claim 1, further comprising an annular array of recesses formed in the wall, wherein each of the recesses includes a pair of tracks formed therein, wherein the plurality of restrictors are coupled to the outer joint member at each of the pair of tracks.

5. A joint assembly comprising:
   a hollow outer joint member including a wall forming an open end and a closed end;
   an inner joint member having a plurality of roller assemblies coupled thereto, the plurality of roller assemblies received in the outer joint member; and
   a restrictor configured to engage at least one of the plurality of roller assemblies to militate against decoupling of the inner joint member with respect to the outer joint member, wherein the restrictor is a pop-rivet, a stud, a pin, a screw, a bolt, or a rod.

6. The joint assembly of claim 5, wherein the restrictor extends through the wall of the outer joint member.

7. A joint assembly comprising:
   a hollow outer joint member including a wall forming an open end and a closed end, the hollow outer joint member having an annular array of recesses formed therein, each of the annular array of recesses having a pair of longitudinally extending opposing tracks;
   an inner joint member having a plurality of roller assemblies coupled thereto, the plurality of roller assemblies received in the pair of tracks and movable along the pair of tracks with respect to an axial direction of the outer joint member; and
   a restrictor coupled to the wall of the outer joint member, the restrictor configured to engage with at least one of the plurality of roller assemblies to militate against decoupling of the inner joint member with respect to the outer joint member, wherein the restrictor is a pop-rivet, a stud, a pin, a screw, a bolt, or a rod.

8. The joint assembly of claim 7, wherein the outer joint member has a tri-lobal cross-sectional shape.

* * * * *